(12) United States Patent
Barron, Jr. et al.

(10) Patent No.: US 6,840,671 B2
(45) Date of Patent: Jan. 11, 2005

(54) SYSTEM AND METHOD FOR NON-CONTACT TEMPERATURE SENSING

(76) Inventors: William R. Barron, Jr., 2 Ledge Rock Rd., Concord, MA (US) 01742; Thomas Larrick, 34 Vose Hill Rd., Westford, MA (US) 01886

(*) Notice: Subject to any disclaimer, the term of this patent is extended or adjusted under 35 U.S.C. 154(b) by 1 day.

(21) Appl. No.: 10/119,426

(22) Filed: Apr. 9, 2002

(65) Prior Publication Data

US 2002/0146057 A1 Oct. 10, 2002

Related U.S. Application Data

(60) Provisional application No. 60/282,588, filed on Apr. 9, 2001.

(51) Int. Cl.[7] .......................... G01K 15/00; G01J 5/52; G01J 5/02
(52) U.S. Cl. ........................... 374/130; 374/1; 374/121
(58) Field of Search ................... 374/120, 128, 374/130, 2, 45, 57, 121, 132, 129

(56) References Cited

U.S. PATENT DOCUMENTS

| | | | | |
|---|---|---|---|---|
| 4,445,516 A | * | 5/1984 | Wollnik et al. | 128/736 |
| 4,481,417 A | * | 11/1984 | Inglee | 250/338 |
| 4,634,294 A | * | 1/1987 | Christol et al. | 374/170 |
| 4,733,175 A | * | 3/1988 | Levinson | 324/158 R |
| 4,872,762 A | * | 10/1989 | Koshihara et al. | 374/5 |
| 4,999,614 A | * | 3/1991 | Ueda et al. | 340/588 |
| 5,011,295 A | | 4/1991 | Krishnan et al. | |
| 5,226,732 A | | 7/1993 | Nakos et al. | |
| 5,239,488 A | | 8/1993 | Markham et al. | |
| 5,246,291 A | * | 9/1993 | Lebeau et al. | 374/5 |
| 5,326,173 A | | 7/1994 | Evans et al. | |
| 5,595,182 A | * | 1/1997 | Krivitski | 128/692 |
| 5,602,543 A | * | 2/1997 | Prata et al. | 340/968 |
| 5,690,429 A | * | 11/1997 | Ng | 374/1 |
| 5,738,440 A | | 4/1998 | O'Neill et al. | |
| 5,823,678 A | * | 10/1998 | Hollander et al. | 374/121 |
| 5,911,507 A | * | 6/1999 | Jaynes | 374/102 |
| 5,993,059 A | | 11/1999 | O'Neill et al. | |
| 6,183,127 B1 | | 2/2001 | Hebb et al. | |
| 6,286,992 B1 | * | 9/2001 | Kyrtsos | 374/45 |
| 6,299,346 B1 | | 10/2001 | Ish-Shalom et al. | |
| 6,349,269 B1 | * | 2/2002 | Wallace, Jr. | 702/132 |
| 6,360,935 B1 | * | 3/2002 | Flake | 228/103 |
| 6,377,400 B1 | * | 4/2002 | Hollander | 359/618 |
| 6,517,236 B2 | * | 2/2003 | Sun et al. | 374/4 |
| 6,517,238 B2 | * | 2/2003 | Sun et al. | 374/43 |
| 2002/0027941 A1 | * | 3/2002 | Schlagheck et al. | 374/5 |

FOREIGN PATENT DOCUMENTS

JP 200201383 A * 6/2000 ........... F25B/15/00

* cited by examiner

*Primary Examiner*—Gail Verbitsky
(74) *Attorney, Agent, or Firm*—Joseph Stecewycz

(57) ABSTRACT

Disclosed is a temperature sensing device and system including a processor, a memory, and optics for collecting incident infrared energy to produce a temperature signal. The device and system function in accordance with a disclosed method to derive one or more signal parameters from the infrared energy, such as signal strength and signal dilution, and compare the parameter(s) with acceptable, pre-defined limits. A filtered or unfiltered temperature indication is provided if all parameters lies within pre-defined limits, and a different temperature indication is displayed if one or more parameters exceeds pre-defined limits.

17 Claims, 6 Drawing Sheets

SYSTEM AND METHOD FOR NON-CONTACT TEMPERATURE SENSING

CROSS-REFERENCE TO RELATED APPLICATION

This application claims the benefit of Provisional Patent Application Ser. No. 60/282,588 filed Apr. 9, 2001.

FIELD OF THE INVENTION

The invention relates to non-contact temperature sensing and, in particular, to a system and method for providing reliable temperature readings.

BACKGROUND OF THE INVENTION

It is known in the art to use radiometric techniques to provide for non-contact measurement of temperatures. See, for example, U.S. Pat. No. 3,932,744 "Null Balance Radiometric Apparatus" and U.S. Pat. No. 4,561,786 "Temperature Measurement Apparatus," both issued to Anderson. Recent advances in infrared and digital technology have resulted in broader temperature ranges, improved optics, faster response times, and tighter calibration accuracy for most infrared thermometers. However, despite these advances in sensor performance, the ability to properly apply the technology still remains the dominant factor adversely affecting measurement accuracy and reliability. Even the best-planned installation cannot anticipate every factor that may affect a sensor's measurement ability. Ultimately, the performance of the sensor is dependent upon the ability to minimize or eliminate the impact of interfering process conditions.

What is needed is a sensor which continuously monitors process conditions and responds appropriately to provide more accurate and reliable temperature measurements.

SUMMARY OF THE INVENTION

The present invention discloses a temperature sensing device including optics for collecting incident infrared energy, a processor, and a memory. The device functions to determine one or more signal parameters, such as signal strength and signal dilution, and compares the parameter with pre-specified acceptable limits. One temperature indication is provided if the limits are met, and another temperature indication is displayed if the limits are not met.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
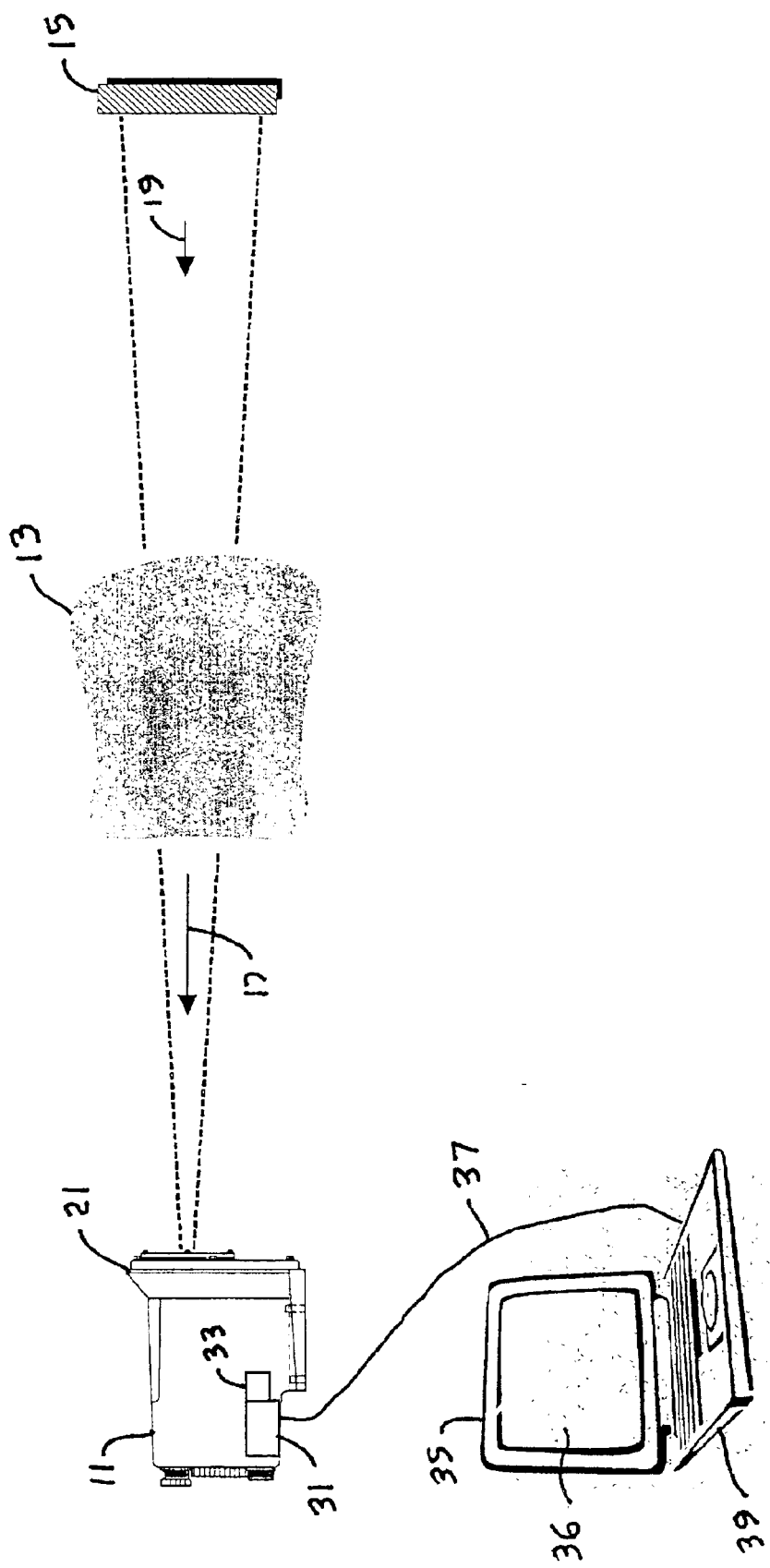
FIG. 1 shows a radiometric temperature sensor performing a temperature measurement of a target surface through intervening media.

It can be appreciated by one skilled in the relevant art that the accuracy of an indicated temperature reading obtained by a radiometric temperature sensor 11 may be affected by the presence of intervening media 13, such as smoke, dust, steam, windows, spray, or mechanical obstructions, where the media 13 is present between a remote target 15 being measured and the radiometric temperature sensor 11, as shown in FIG. 1. The target 15 may be a selected material, such as glass, aluminum, or silicon, and/or a selected product, such as a block, a rod, or a wafer. The radiometric temperature sensor 11 functions by using an internal infrared temperature sensor (not shown) to collect incident infrared energy 17. In the example provided, the incident infrared energy 17 comprises emitted infrared energy 19 originating at the target 15 and modified by the intervening media 13.

Figure 2:
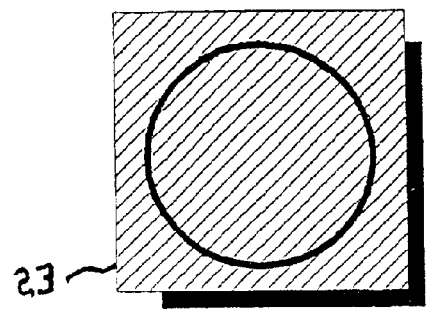
FIG. 2 is an illustration of a full field of view as imaged by the radiometric temperature sensor of FIG. 1.
Figure 3:
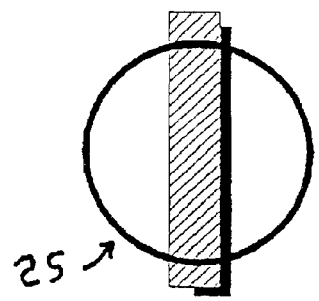
FIG. 3 is an illustration of a small field of view as imaged by the radiometric temperature sensor of FIG. 1.
Figure 4:
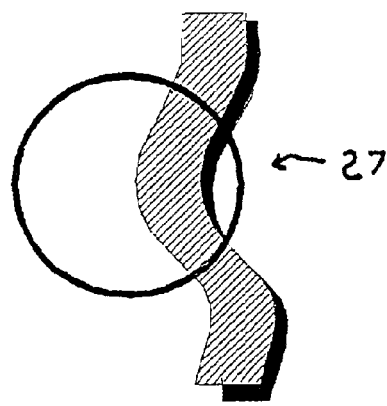
FIG. 4 is an illustration of a wandering field of view as imaged by the radiometric temperature sensor of FIG. 1.

The internal infrared temperature sensor uses an optical system 21 to collect the incident infrared energy 17 from the target 15 being measured. A temperature measurement is determined from data obtained at one or more wavelengths of the collected infrared energy 17 as is well-known in the relevant art. The resultant temperature measurement may be affected by one or more environmental factors, including emissivity variation in the target 15, misalignment of the radiometric temperature sensor 11, optical obstructions in the path between the radiometric temperature sensor 11 and the target 15, and stray reflected infrared energy incident on the radiometric temperature sensor 11. Proper alignment of the radiometric temperature sensor 11 results in a preferred 'full' field of view (FOV) 23 where the target 15 fills the measured area, shown in FIG. 2. In comparison, a misaligned radiometric temperature sensor 11 may produce a small FOV 25 where the target 15 is centered in but does not fill the measured area shown in FIG. 3, or a 'wandering' FOV 27 where the target 15 does not fill the measured area and also moves within the area shown in FIG. 4.

Accordingly, when one or more of the above adverse conditions is present, the temperature reading indicated on the display (not shown) of the radiometric temperature sensor 11 may become unreliable or inaccurate. Accordingly, the user of the radiometric temperature sensor 11 would have no way of knowing that the displayed temperature reading is incorrect. This problem is overcome in the radiometric temperature sensor 11 by also using two additional signal parameters derived during the process of collecting the incident infrared energy 17.

The first derived signal parameter is signal strength, or emissivity, a relative measurement of the infrared energy 19 being emitted by the target 15, in FIG. 1. When the field of view of the radiometric temperature sensor 11 is 'full' and unobstructed, the signal strength value represents the emissivity of the surface of the target 15. The signal strength parameter typically lies between 0 and 2.

The second derived signal parameter is signal dilution, a relative measurement of the amount of infrared energy being emitted by the target 15 to the amount of infrared energy required by the radiometric temperature sensor 11 to produce a reading. The signal dilution parameter typically ranges from 0:1 to 6000:1.

Low signal strength and signal dilution values may be indicative of dirty sensor optics, poor alignment, or the presence of optical obstructions. High signal strength and signal dilution values may be indicative of background source reflections or other high temperature sources incident on the optical system 21. It follows that, when a temperature reading is obtained when either or both the signal strength and signal dilution values are higher or lower than normally expected, the resultant temperature reading may no longer be considered accurate.

In the disclosed system and method for non-contact temperature sensing, the signal strength and signal dilution values are continuously monitored during the temperature measurement process to provide an indication of measurement reliability. When either the signal strength value or the signal dilution value moves outside a preestablished range, the indicated temperature reading is considered to be unreliable or inaccurate. In one embodiment, the radiometric temperature sensor 11 includes a processor 31 and a memory 33 for indicating that the sensing environment is producing an inaccurate temperature reading, in accordance with the disclosed method described in greater detail below. For example, this indication can be provided as: i) a displayed status or error message indicating that an accurate reading is no longer being obtained, ii) by displaying a default, minimum temperature reading, or iii) by using an internal peak-hold feature to continue displaying the most-recent, accurate temperature reading as a fixed temperature reading on the radiometric temperature sensor 11, while the signal strength value or the signal dilution value remains outside the pre-established range.

In an alternative embodiment, a computer 35 is attached to the radiometric sensor using a cable 37, such as an RS485 or an RS232 cable. The computer 35 includes a processor and memory (not shown) for performing the disclosed method described below. In the alternative embodiment, the radiometric temperature sensor 11 can be used to acquire the incident infrared energy 17, and then send raw infrared data, temperature data, signal strength data, and/or signal dilution data to the computer via the cable 37. If infrared data is sent to the computer 35 by the radiometric temperature sensor 11, the computer 35 is used to derive the signal strength data and the signal dilution data. Any or all of the infrared energy data, the temperature reading, the signal strength data, and the signal dilution data can be displayed on the computer screen 36 instead of or in addition to appearing on the display of the radiometric temperature sensor 11. In yet another alternative embodiment, steps for performing the disclosed method are read from or loaded into the computer 35 or the temperature sensor 11 from a computer-readable medium 39 (here shown inserted into the computer 35). The computer-readable medium 39 can be a magnetic or an optical disk, for example.

Figure 5:
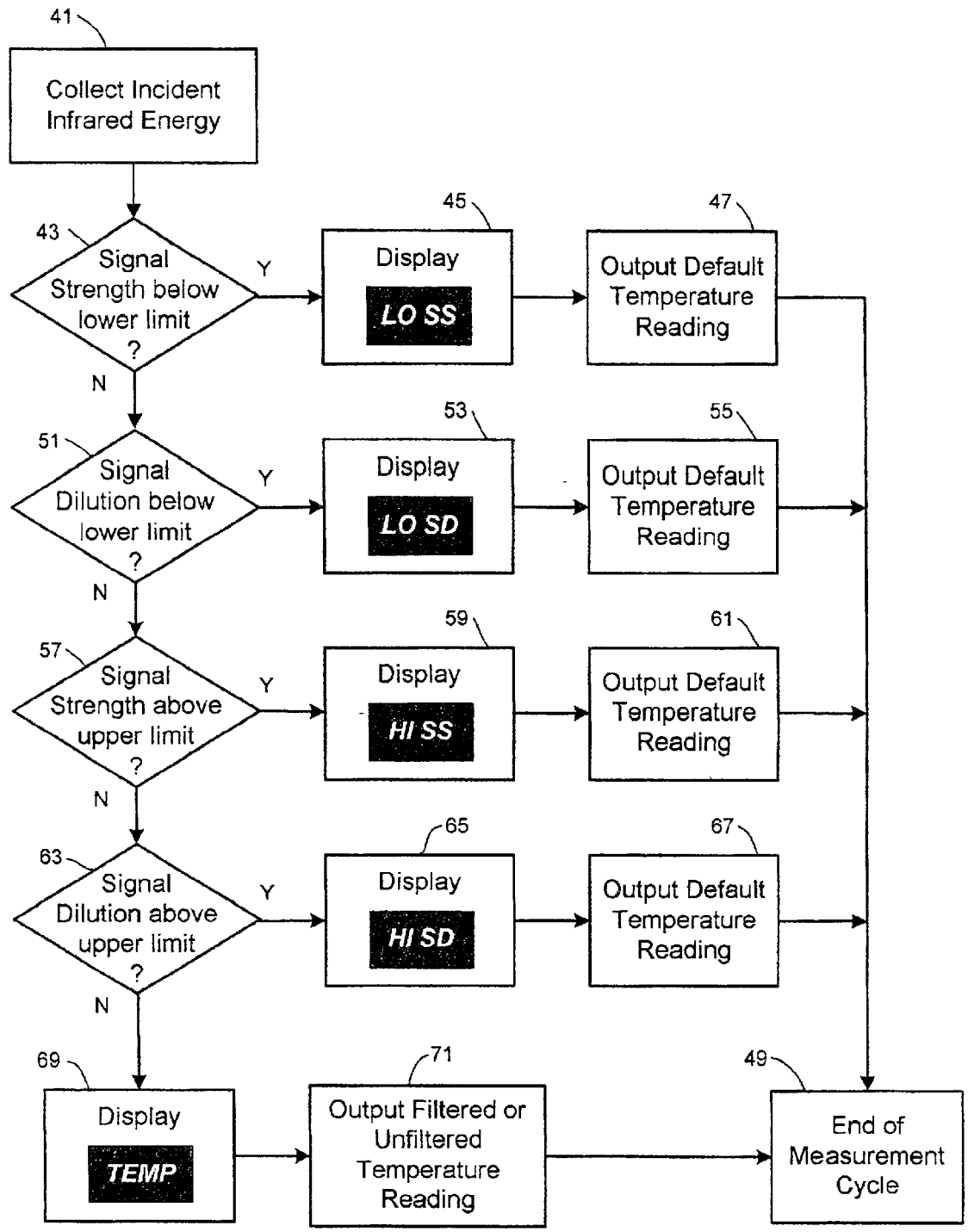
FIG. 5 is a flow diagram illustrating a first preferred embodiment for providing reliable temperature readings in the radiometric temperature sensor of FIG. 1.

A preferred embodiment of the disclosed temperature-sensing process is illustrated in the flow diagram of FIG. 5 illustrating one measurement cycle. It should be understood that the measurement cycle can be repeated indefinitely for applications in which a continuous temperature reading is being obtained. The incident infrared energy 17 is collected by the optical system 21, at step 41. The current signal strength value (SS) is compared with a pre-established signal strength lower limit value, at decision block 43. If the current signal strength value is less than the lower limit, then the radiometric temperature sensor 11 displays a suitable reading, such as 'LO SS,' at step 45, and the temperature display output reading is set to a pre-established value or to a default value, such as a minimum temperature reading, at step 47. At this point, the current temperature measurement cycle may end, at step 49, or may be repeated as desired by the particular setting or mode of the radiometric temperature sensor 11.

If the current signal strength value is not less than the lower limit, the current signal dilution value (SD) is compared with a pre-established signal dilution lower limit value, at decision block 51. If the current signal dilution value is less than the signal dilution lower limit, then the radiometric temperature sensor 11 displays a suitable reading, such as 'LO SD,' at step 53, and the temperature display output reading is set to the pre-established or default value, at step 55, and the current measurement cycle ends, at step 49.

If the current signal dilution value is not less than the signal dilution lower limit value, the current signal strength value is compared with a pre-established signal strength upper limit value, at decision block 57. If the current signal strength value is greater than the upper limit, then the radiometric temperature sensor 11 displays a suitable reading, such as 'HI SS,' at step 59, and the temperature display output reading is set to the pre-established or default value, at step 61. The current temperature measurement cycle may end, at step 49, or may be repeated.

If the current signal strength value is not greater than the signal strength upper limit, the current signal dilution value is compared with a pre-established signal dilution upper limit, at decision block 63. If the current signal dilution value is greater than the signal dilution upper limit, the radiometric temperature sensor 11 displays another suitable reading, such as 'HI SD,' at step 65, and the temperature display output reading is set at the pre-established or default value, at step 67.

If the current signal dilution value is not greater than the signal dilution upper limit, the radiometric temperature sensor 11 displays a suitable indicator, such as 'FILTERED TEMPERATURE' or "TEMP,' at step 69, and the filtered temperature value is displayed as the current temperature reading, at step 71. The measurement cycle may end, at step 49, or repeat as desired. As understood in the relevant art, an unfiltered temperature is initially obtained from incident infrared energy 17 where there are no conditioning filters applied. Signal conditioning filters, which provide for time averaging or peak holding, may be applied to obtain the filtered temperature reading.

Figure 6:
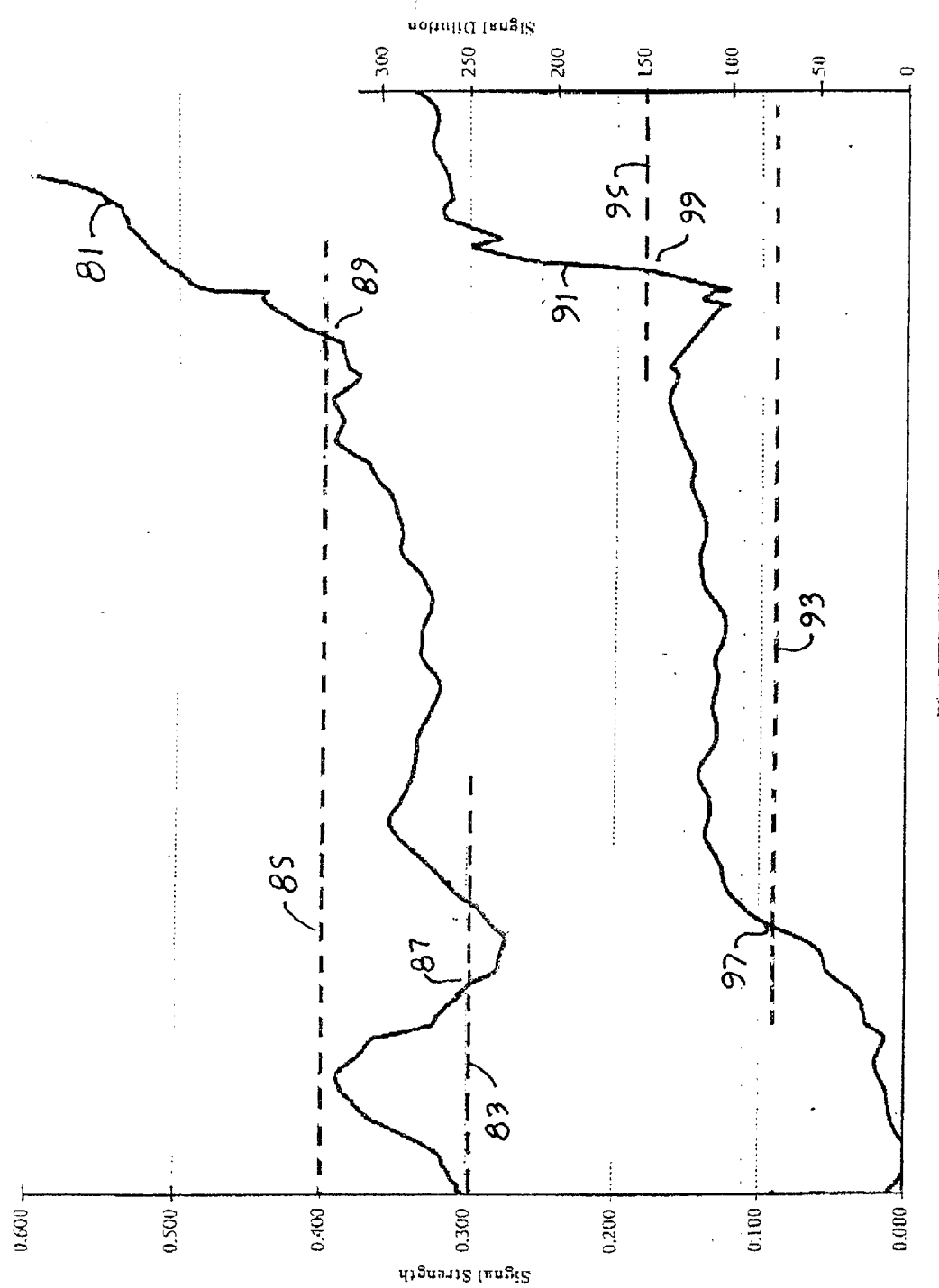
FIG. 6 shows curves for a signal strength reading and a signal dilution reading with respective pre-established upper and lower limit values.

The disclosed temperature sensing process can be explained in greater detail with reference to the graphs of FIGS. 6–7. FIG. 6 includes a signal strength curve 81 and a signal dilution curve 91, as exemplary of a typical remote measurement application. A signal strength upper limit 85, or maximum value, has been set at 0.400 and a signal strength lower limit 83, or minimum value, has been set at 0.300. When the signal strength curve 81 drops below signal strength lower limit 83 at crossover point 87, corresponding to optical misalignment, for example, the filtered or unfiltered temperature reading will not be used. Similarly, when the signal strength curve 81 exceeds the signal strength upper limit 85 at crossover point 89, corresponding to an unacceptable increase in reflections, for example, the temperature reading will no longer be considered to be accurate or reliable.

Similarly, the signal dilution upper limit 95 has been set at 150, and the signal dilution lower limit 93 has been set at 85. When the signal dilution curve 91 exceeds the signal dilution lower limit 93, at crossover point 97, corresponding to a reduction of intervening smoke to an acceptable level for example, the current filtered or unfiltered temperature would be considered as an accurate reading. When the signal dilution curve 91 exceeds the signal dilution upper limit 95, at crossover point 99, the current filtered temperature would no longer be considered as accurate.

The upper and lower limits specified in FIG. 6 are preferably obtained empirically during a calibration process, by comparing indicated temperature reading with the output of a thermocouple or other temperature indication device placed at the target. In way of example, heavy smoke may cause the radiometric temperature sensor 11 to measure below the true temperature that is measured by the reference thermocouple. The signal dilution value may also contemporaneously drop below a level of 85 when such a heavy smoke condition exists. Based on this observation, a lower limit of 85 is specified for the signal dilution reading. At a later stage of the calibration process, significant reflections may cause the radiometric temperature sensor 11 to measure higher than measured by the reference thermocouple. During this stage, the signal strength may have increased to 0.4, and the signal dilution may have increased to 150. Based on this observation, the upper limit for the signal strength is specified to be 0.4, and the upper limit for the signal dilution is specified to be 150.

Figure 7:
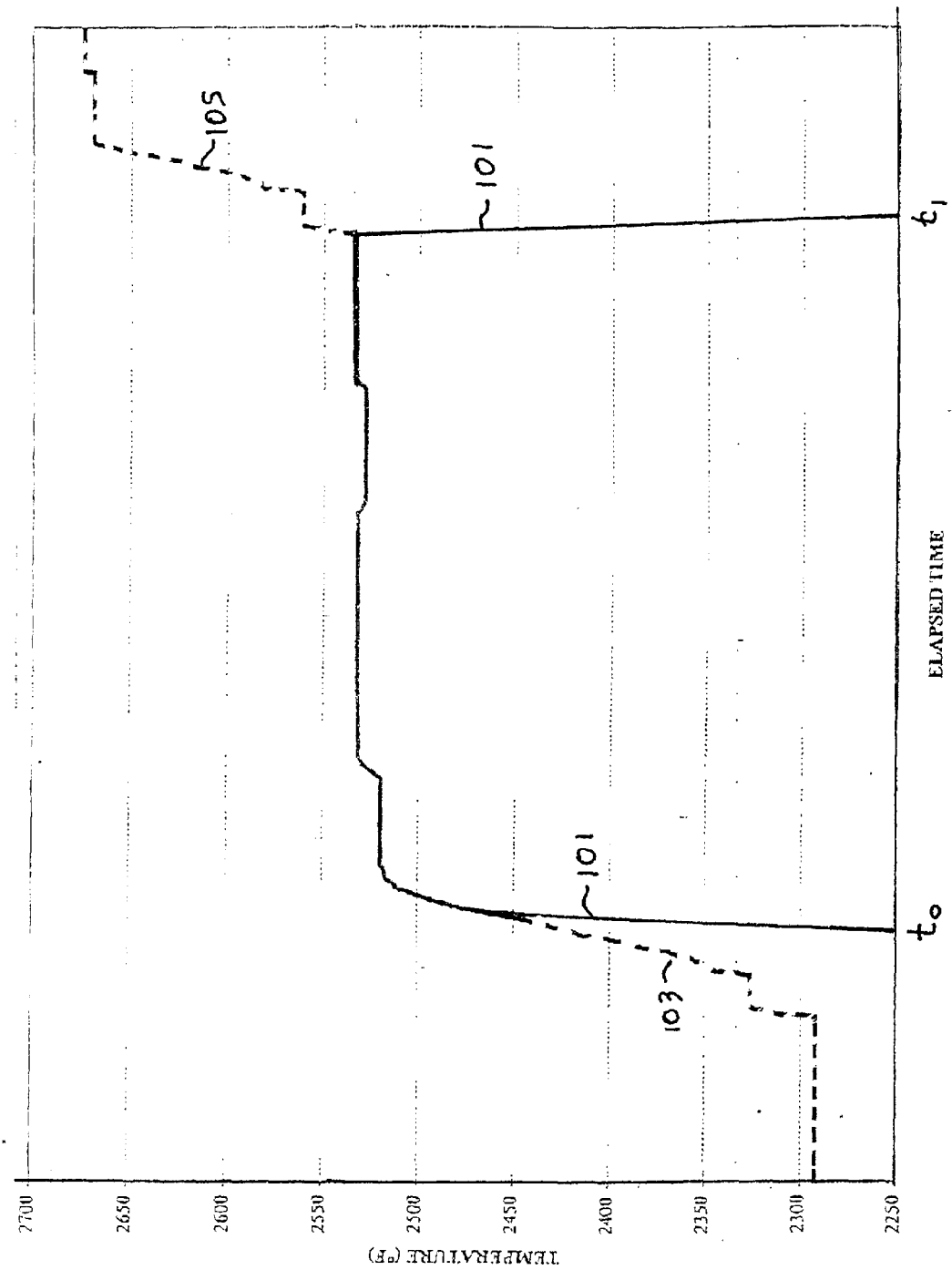
FIG. 7 is a graph representing the displayed temperature reading on the radiometric temperature sensor of FIG. 1.

The signal strength and signal dilution maximum and minimum values shown in FIG. 5 are then used to produce the temperature output described by a temperature display curve 101 (solid line) in FIG. 7. At a time $t_0$, the signal dilution value equals the signal dilution lower limit or minimum, corresponding to the crossover point 97 in FIG. 6. For the time period $t<t_0$, the temperature display reading was the pre-established minimum or default value, corresponding to step 47 or 55 in the flow chart of FIG. 5. Otherwise, an inaccurate (i.e., low) series of temperature readings, indicated by the dashed curve 103, would have been displayed.

For the time period $t_0 \leq t \leq t_1$, the displayed temperature reading is the filtered or unfiltered temperature value obtained by the radiometric temperature sensor 11, here shown as the temperature display curve 101. Because the signal strength and the signal dilution values are within acceptable limits in the time period $t_0 \leq t \leq t_1$, the temperature values are considered to be accurate.

At the time $t_1$, the signal strength value equals the signal strength upper limit or maximum, corresponding to the crossover point 89 in FIG. 6. Accordingly, for the time period $t>t_1$, the temperature display is the pre-established minimum value, corresponding to step 61 in the flow diagram of FIG. 5. Otherwise, an inaccurate (i.e., high) series of temperature readings, indicated by the dashed curve 105, would have been displayed by the radiometric temperature sensor 11.

The signal strength upper and lower limits, and the signal dilution upper and lower limits are preferably determined empirically via a calibration procedure. The calibration values so obtained are subsequently stored in the memory 33 of the radiometric temperature sensor 11 prior to performing temperature measurements. A first step in this calibration process includes the collection of data, for a particular application, under a wide range of operating conditions. For example, the various types of applications to which the disclosed method can be applied include remote temperature sensing of the following groups of materials and products:

Aluminum and other nonferrous metals
Galvannealed steel
Glass molds
Molten metals
Small wires
Semiconductor substrate wafers
Stainless steel
Welded tubes The calibration procedure for a selected material and/or product includes obtaining a series of temperature measurements for a range of operating conditions, operating temperatures, or other environmental parameter(s). As the operating condition is varied, one or more of the following values are obtained and recorded:

A reference temperature, such as provided by a thermocouple placed on the remote material or product
The filtered temperature reading provided by the sensor
The signal strength value
The signal dilution value
Any distinguishing notes regarding the operating conditions for the selected material or product For example, if a meaningful change is observed in the signal strength value, the technician recording the data during the calibration process makes a note describing any related changes occurring in the operating conditions. The data so obtained is analyzed to establish a valid range of values for the signal strength and signal dilution readings, as explained above. When either the signal strength or the signal dilution value lies outside limits defined by the corresponding valid range, the filtered or unfiltered temperature value is then determined to not accurately reflect the reference temperature readings. By specifying an acceptable accuracy for the filtered temperature reading, the minimum and maximum values for the signal strength value and the signal dilution value can be found from the calibration process.

Figure 8:
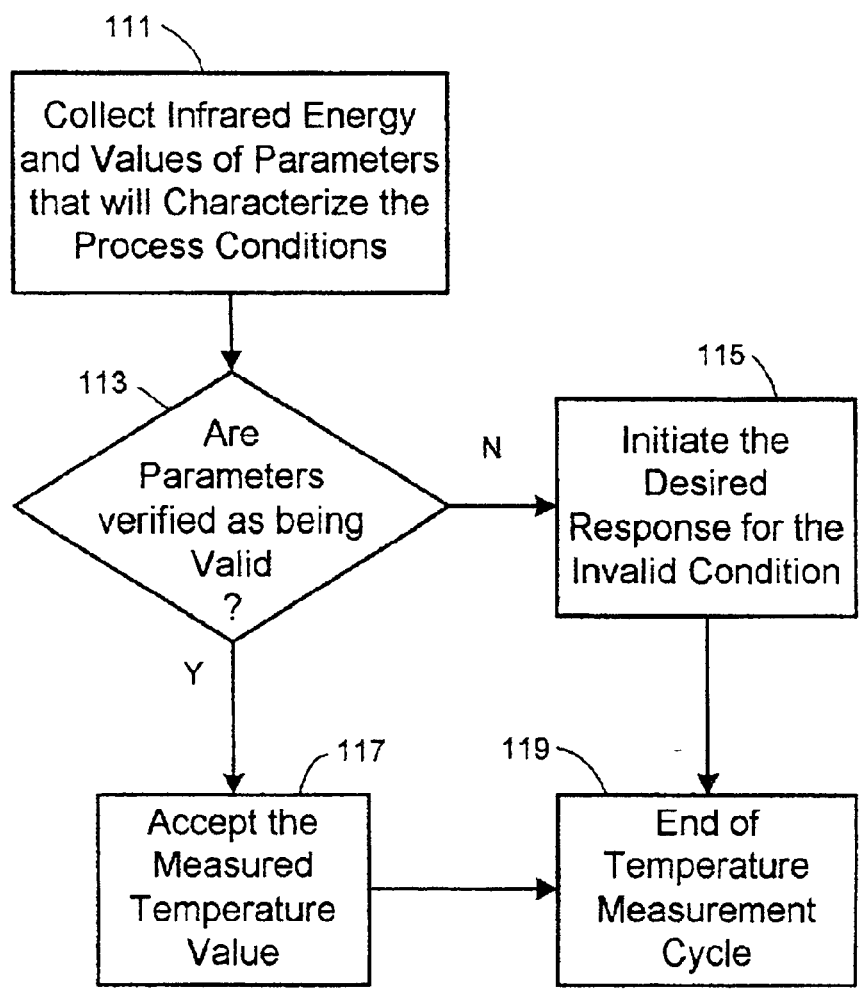
FIG. 8 is a flow diagram illustrating a generalized process for providing reliable temperature readings in the radiometric temperature sensor of FIG. 1.

A generalized description of the disclosed temperature-sensing process is illustrated in the flow diagram of FIG. 8, where the measurement cycle can be repeated for a continuous temperature reading. The incident infrared energy 17 is collected and the relevant parameters are obtained, at step 111. A relevant parameter may be the unfiltered target temperature, the filtered target temperature, signal strength, and/or signal dilution.

A verification step is performed, at decision block 113, to determine whether the relevant parameter(s) meets a specified criterion. The particular criterion can be based on the specific characteristics of a particular application. For example, the criterion can be determining whether the signal strength lies within a specified range, or whether the ambient temperature is out of range for proper functioning of the radiometric temperature sensor 11. If the relevant parameter is not valid, a response is initiated for the invalid condition, at step 115. The response may comprise displaying a status message, changing the temperature value, sounding an alarm, providing a flashing or other type of unique display, or by using an internal peak-hold feature to continue displaying the most-recent, accurate temperature reading on the radiometric temperature sensor 11. If, on the other hand, the relevant parameter is valid, the measured temperature value is accepted, at step 117. The temperature measurement cycle terminates at step 119 from either step 115 or step 117.

The above is a description of the realization of the invention and its embodiments utilizing examples. It should be self-evident to a person skilled in the relevant art that the invention is not limited to the details of the above presented examples, and that the invention can also be realized in other embodiments without deviating from the characteristics of the invention. Thus, the possibilities to realize and use the invention are limited only by the claims, and by the equivalent embodiments which are included in the scope of the invention.

What is claimed is:

1. A method for obtaining a temperature measurement of a remote target, said method comprising the steps of:
   collecting incident infrared energy from the target to obtain a temperature signal;
   deriving a signal strength value and a signal dilution value from said incident infrared energy;
   if both said signal strength value and said signal dilution value lie within respective pre-defined limits, providing a first temperature indication by displaying a temperature reading corresponding to said temperature signal; and
   if either said signal strength value or said signal dilution value lies outside said respective pre-defined limits, providing a second temperature indication.

2. A method as in claim 1 wherein said temperature signal comprises a filtered temperature signal.

3. A method as in claim 1 wherein said step of providing a second temperature indication comprises the step of displaying an error message.

4. A method as in claim 1 wherein said step of providing a second temperature indication comprises the step of displaying a continuous temperature reading.

5. A method as in claim 1 wherein said step of providing a second temperature indication comprises the step of continuing to display the most-recent temperature reading.

6. A remote temperature sensing device comprising:
   optical means for collecting incident infrared energy from a target to produce a temperature signal;
   processor means for deriving signal strength and signal dilution from said collected infrared energy;
   processor means for comparing at least one of said signal strength and said signal dilution with corresponding acceptable ranges of values;
   means for displaying a first temperature indication if at least one of said signal strength and said signal dilution lies outside said corresponding acceptable range of values; and
   means for displaying a second temperature indication if both of said signal strength and said signal dilution lie within said acceptable ranges of values.

7. A remote temperature sensing device as in claim 6 further comprising a memory for storing said acceptable ranges of values.

8. A computer-readable medium comprising computer-executable instructions for obtaining a temperature measurement of a remote target by performing the steps of:
   collecting incident infrared energy from the target to derive a temperature signal;
   measuring signal strength of said incident infrared energy;
   measuring signal dilution of said incident infrared energy;
   if both signal strength and signal dilution lie within pre-defined limits, providing a first temperature indication; and
   if either signal strength or signal dilution lies outside said pre-defined limits, providing a second temperature indication.

9. The computer-readable medium as in claim 8 wherein said step of providing a first temperature indication comprises the step of displaying a filtered temperature obtained from said temperature signal.

10. The computer-readable medium as in claim 8 wherein said step of providing a second temperature indication comprises the step of displaying an error message.

11. The computer-readable medium as in claim 8 wherein said step of providing a second temperature indication comprises the step of displaying a continuous temperature reading.

12. A remote temperature sensing system comprising:
    a radiometric temperature sensor for collecting incident infrared energy from a target to produce infrared energy data;
    first processor means for determining a temperature reading from said infrared energy data;
    second processor means for determining signal strength and signal dilution from said infrared energy data; and
    third processor means for comparing at least one of said signal strength and said signal dilution with corresponding acceptable ranges of values.

13. The remote temperature sensing system as in claim 12 further comprising display means for displaying a first temperature indication if at least one of said signal strength and said signal dilution lies outside said corresponding acceptable range of values and for displaying a second temperature indication if both of said signal strength and said signal dilution lie within said acceptable ranges of values.

14. The remote temperature sensing system as in claim 13 wherein said display means comprises a computer screen.

15. The remote temperature sensing system as in claim 12 further comprising a cable disposed between said radiometric temperature sensor and at least one of said first, second, and third processor means.

16. The remote temperature sensing system as in claim 15 further comprising a computer attached to said cable, said computer including at least one of said first, second, and third processor means.

17. The remote temperature sensing system as in claim 12 wherein said radiometric temperature sensor includes said first processor means.

* * * * *